(12) United States Patent
Nathan (10) Patent No.: US 8,843,991 B2
(45) Date of Patent: *Sep. 23, 2014

(54) AUDIOVISUAL REPRODUCTION SYSTEM (75) Inventor: Guy Nathan, Yerres (FR)

(73) Assignee: TouchTunes Music Corporation, New York, NY (US)

( * ) Notice: Subject to any disclaimer, the term of this patent is extended or adjusted under 35 U.S.C. 154(b) by 299 days.

This patent is subject to a terminal disclaimer.

(21) Appl. No.: 12/801,272

(22) Filed: Jun. 1, 2010

(65) Prior Publication Data

US 2010/0241259 A1 Sep. 23, 2010

Related U.S. Application Data (60) Continuation of application No. 11/797,421, filed on May 3, 2007, now Pat. No. 7,757,264, which is a (Continued)

(30) Foreign Application Priority Data

Jul. 22, 1998 (FR) ...................................... 98 09352

(51) Int. Cl.
*H04N 7/16* (2011.01)
*G11B 27/00* (2006.01)

(Continued)

(52) U.S. Cl.
CPC .......... *G11B 27/002* (2013.01); *H04N 21/6332* (2013.01); *H04N 21/232* (2013.01); *H04N 21/41415* (2013.01); *H04N 21/25841* (2013.01); *H04N 21/2542* (2013.01); *H04N 21/6543* (2013.01); *H04N 21/26258* (2013.01); *G06Q 30/0241* (2013.01); *G06Q 40/00* (2013.01); *G07F 17/305* (2013.01); *G10H 2240/181* (2013.01); *G11B 27/34* (2013.01); *G11B 2220/2545* (2013.01); *G11B 2220/40* (2013.01)
USPC ......................................................... 725/139

(58) Field of Classification Search
CPC ............ H04N 21/232; H04N 21/2542; H04N 21/25841; H04N 21/26258; H04N 21/41415; H04N 21/6332; H04N 21/6543
USPC ......................................................... 725/139
See application file for complete search history.

(56) References Cited

U.S. PATENT DOCUMENTS 3,807,541 A    4/1974 Kortenhaus
3,982,620 A    9/1976 Kortenhaus (Continued)

FOREIGN PATENT DOCUMENTS

AU    199954012    4/2000
DE    3406058      8/1985

(Continued)

OTHER PUBLICATIONS

"Ecast Forges Landmark International Technology Partnership", Business Wire at www.findarticles.com/cf_0/m0EIN/2000_July_25/63663604/print.jhtml, 2 pages, Jul. 25, 2000.

(Continued)

*Primary Examiner* — Dominic D Saltarelli
(74) *Attorney, Agent, or Firm* — Nixon & Vanderhye PC (57) ABSTRACT

Audiovisual reproduction system comprising a central unit managing a sound control circuit, and a telecommunications modem connected to a distribution network controlled by a host server, through a multitask operating system created around a tools and services library, characterized in that the operating system comprises a function that adjusts the sound control circuit to couple volumes in the various areas in which the loudspeakers in the audiovisual reproduction system are used, this function being accessible through a management mode of the multitask operating system, the coupling maintaining the ratios between the various volumes in each area when the volume in one area is modified.

3 Claims, 1 Drawing Sheet

Related U.S. Application Data continuation of application No. 09/621,674, filed on Jul. 24, 2000, now Pat. No. 7,231,656, which is a division of application No. 09/357,762, filed on Jul. 21, 1999, now Pat. No. 6,336,219.

(51) Int. Cl.
| | |
|---|---|
| H04N 21/6332 | (2011.01) |
| H04N 21/414 | (2011.01) |
| H04N 21/6543 | (2011.01) |
| H04N 21/262 | (2011.01) |
| G06Q 30/02 | (2012.01) |
| G06Q 40/00 | (2012.01) |
| G07F 17/30 | (2006.01) |
| H04N 21/232 | (2011.01) |
| H04N 21/258 | (2011.01) |
| H04N 21/254 | (2011.01) |
| G11B 27/34 | (2006.01) |

(56) References Cited

U.S. PATENT DOCUMENTS

| | | |
|---|---|---|
| 4,008,369 A | 2/1977 | Theurer et al. |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimara |
| 5,077,607 A | 12/1991 | Johnson et al. |
| 5,081,534 A | 1/1992 | Geiger et al. |
| 5,101,499 A | 3/1992 | Streck et al. |
| 5,106,097 A | 4/1992 | Levine |
| 5,117,407 A * | 5/1992 | Vogel ........................... 386/230 |
| 5,138,712 A | 8/1992 | Corbin |
| 5,148,159 A | 9/1992 | Clark et al. |
| 5,155,847 A | 10/1992 | Kirouac |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,339,095 A | 8/1994 | Redford |
| 5,339,413 A | 8/1994 | Koval et al. |
| 5,341,350 A | 8/1994 | Frank |
| 5,355,302 A | 10/1994 | Martin |
| 5,357,276 A | 10/1994 | Banker |
| 5,369,778 A | 11/1994 | San Soucie |
| 5,375,206 A | 12/1994 | Hunter |
| 5,386,251 A | 1/1995 | Movshovich |
| 5,389,950 A | 2/1995 | Martin et al. |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |

(56) References Cited

U.S. PATENT DOCUMENTS

| | | |
|---|---|---|
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike et al. |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankovitz |
| 5,708,811 A | 1/1998 | Arendt |
| 5,712,976 A | 1/1998 | Falcon |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,751,336 A | 5/1998 | Aggarwal et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |
| 5,774,672 A | 6/1998 | Funahashi |
| 5,781,889 A | 7/1998 | Martin |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,872,747 A * | 2/1999 | Johnson ............... 369/30.08 |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,193 A | 3/1999 | Takahashi |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |

(56) References Cited

U.S. PATENT DOCUMENTS

| | | |
|---|---|---|
| 5,923,885 A | 7/1999 | Johnson |
| 5,926,531 A | 7/1999 | Petite |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,963,916 A | 10/1999 | Kaplan |
| 5,966,495 A | 10/1999 | Takahashi |
| 5,978,855 A | 11/1999 | Metz |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,227 B1 | 4/2001 | Goldstein et al. |
| 6,219,692 B1 | 4/2001 | Stiles |
| 6,223,209 B1 | 4/2001 | Watson |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,356,971 B1 | 3/2002 | Katz et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,130 B1 | 9/2002 | Grapes |
| 6,449,688 B1 | 9/2002 | Peters et al. |
| 6,470,496 B1 | 10/2002 | Kato et al. |
| 6,488,508 B2 | 12/2002 | Okamoto |
| 6,490,570 B1 | 12/2002 | Numaoka |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,789,215 B1 | 9/2004 | Rupp et al. |
| 6,816,578 B1 | 11/2004 | Kredo et al. |
| 6,898,161 B1 | 5/2005 | Nathan |
| 6,904,592 B1 | 6/2005 | Johnson |
| 6,928,653 B1 | 8/2005 | Ellis et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,107,109 B1 | 9/2006 | Nathan et al. |
| 7,124,194 B2 | 10/2006 | Nathan et al. |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,293,277 B1 | 11/2007 | Nathan |

(56) References Cited

U.S. PATENT DOCUMENTS

| | | |
|---|---|---|
| 7,356,831 B2 | 4/2008 | Nathan |
| 7,406,529 B2 | 7/2008 | Reed |
| 7,424,731 B1 | 9/2008 | Nathan et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,749,083 B2 | 7/2010 | Nathan et al. |
| 7,757,264 B2 | 7/2010 | Nathan |
| 7,783,774 B2 | 8/2010 | Nathan et al. |
| 7,793,331 B2 | 9/2010 | Nathan et al. |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0129036 A1 | 9/2002 | Ho Yuen Lok et al. |
| 2002/0162104 A1 | 10/2002 | Raike et al. |
| 2003/0005099 A1 | 1/2003 | Sven et al. |
| 2003/0008703 A1 | 1/2003 | Gauselmann |
| 2003/0018740 A1 | 1/2003 | Sonoda et al. |
| 2003/0031096 A1 | 2/2003 | Nathan et al. |
| 2003/0041093 A1 | 2/2003 | Yamane et al. |
| 2003/0065639 A1 | 4/2003 | Fiennes et al. |
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1 | 6/2003 | Itkis et al. |
| 2003/0108164 A1 | 6/2003 | Laurin et al. |
| 2003/0135424 A1 | 7/2003 | Davis et al. |
| 2003/0208586 A1 | 11/2003 | Mastronardi et al. |
| 2003/0225834 A1 | 12/2003 | Lee et al. |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2005/0060405 A1 | 3/2005 | Nathan et al. |
| 2005/0073782 A1 | 4/2005 | Nathan |
| 2005/0086172 A1 | 4/2005 | Stefik |
| 2005/0125833 A1 | 6/2005 | Nathan et al. |
| 2005/0267819 A1 | 12/2005 | Kaplan |
| 2006/0018208 A1 | 1/2006 | Nathan et al. |
| 2006/0035707 A1 | 2/2006 | Nguyen et al. |
| 2006/0062094 A1 | 3/2006 | Nathan et al. |
| 2006/0239131 A1 | 10/2006 | Nathan et al. |
| 2006/0293773 A1 | 12/2006 | Nathan et al. |
| 2007/0121430 A1 | 5/2007 | Nathan |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0247979 A1 | 10/2007 | Brillon et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0239887 A1 | 10/2008 | Tooker et al. |
| 2009/0037969 A1 | 2/2009 | Nathan et al. |
| 2009/0070341 A1 | 3/2009 | Mastronardi et al. |
| 2009/0138111 A1 | 5/2009 | Mastronardi |
| 2009/0265734 A1 | 10/2009 | Dion et al. |
| 2009/0282491 A1 | 11/2009 | Nathan |
| 2010/0042505 A1 | 2/2010 | Straus |
| 2010/0211818 A1 | 8/2010 | Nathan et al. |
| 2010/0241259 A1 | 9/2010 | Nathan |
| 2010/0269066 A1 | 10/2010 | Nathan |

FOREIGN PATENT DOCUMENTS

| | | |
|---|---|---|
| DE | 3723737 A1 | 1/1988 |
| DE | 3820835 A1 | 1/1989 |
| DE | A 3820835 | 1/1989 |
| DE | 3815071 | 11/1989 |
| DE | 4244198 | 6/1994 |
| DE | 19610739 | 9/1997 |
| DE | 19904007 | 8/2000 |
| EP | A0082077 | 6/1983 |
| EP | 0140593 A2 | 5/1985 |
| EP | 0256921 | 2/1988 |
| EP | 0283304 | 9/1988 |
| EP | A 0283350 | 9/1988 |
| EP | 0309298 | 3/1989 |
| EP | A 0313359 | 4/1989 |
| EP | 0340787 | 11/1989 |
| EP | 0363186 | 4/1990 |
| EP | 0 425 168 A | 5/1991 |
| EP | 0464562 A2 | 1/1992 |
| EP | 0480558 | 4/1992 |
| EP | 0498130 | 8/1992 |
| EP | 0498130 A2 | 8/1992 |
| EP | 0 507 110 | 10/1992 |
| EP | 0529834 | 3/1993 |
| EP | 0538319 B1 | 4/1993 |
| EP | A 0631283 | 12/1994 |
| EP | 0632371 | 1/1995 |
| EP | 0 711 076 | 8/1996 |
| EP | 0786122 B1 | 7/1997 |
| EP | 0817103 | 1/1998 |
| EP | 0841616 A2 | 5/1998 |
| EP | 0919964 | 6/1999 |
| EP | 0959570 A1 | 11/1999 |
| EP | 0 974896 A1 | 1/2000 |
| EP | 0974941 | 1/2000 |
| EP | 0982695 | 3/2000 |
| EP | 1001391 | 5/2000 |
| EP | 1408427 | 4/2004 |
| FR | A 2602352 | 2/1988 |
| FR | 2808906 | 11/2001 |
| GB | A 2122799 | 1/1984 |
| GB | 2166328 A | 4/1986 |
| GB | 2170943 | 8/1986 |
| GB | 2193420 | 2/1988 |
| GB | 2 238680 A | 6/1991 |
| GB | 2254469 | 10/1992 |
| GB | 2259398 | 3/1993 |
| GB | 2262170 A | 6/1993 |
| GB | 2380377 | 4/2003 |
| JP | 57-173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 07281682 | 10/1995 |
| JP | 08-279235 | 10/1996 |
| JP | 8274812 | 10/1996 |
| JP | 10-098344 | 4/1998 |
| WO | WO 86 01326 A | 2/1986 |
| WO | WO A 90 07843 | 7/1990 |
| WO | WO 91/08542 | 6/1991 |
| WO | WO A 91 20082 | 12/1991 |
| WO | WO 93/16557 | 8/1993 |
| WO | WO A 93 18465 | 9/1993 |
| WO | WO A 94 03894 | 2/1994 |

(56) References Cited

FOREIGN PATENT DOCUMENTS

| WO | WO 94/14273 | 6/1994 |
|---|---|---|
| WO | WO 94/15306 | 7/1994 |
| WO | WO 94 15416 A | 7/1994 |
| WO | WO 95 03609 A | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96 12258 A | 4/1996 |
| WO | WO 98/07940 | 2/1998 |
| WO | WO 98/45835 | 10/1998 |
| WO | WO 01/00290 | 1/2001 |
| WO | WO 01/08148 | 2/2001 |
| WO | WO 02/095752 | 11/2002 |
| WO | WO 2006/014739 | 2/2006 |

OTHER PUBLICATIONS

"Ecast Selects Viant to Build Siren Entertainment System (TM)", ScreamingMedia, PR Newswire San Francisco, industry.java.sum. com/javanews/stories/story2/0,1072,17618,00.html, 3 pages, Aug. 3, 1999.
Derfler et al., "How Networks Work", Millennium Ed., Que Corporation, Jan. 2000.
European Search Report from EP 1 993 079.
European Search Report issued for European Application No. 08000845.1-1238/1962251, dated Apr. 3, 2009.
Gralla, "How the Internet Works", Millennium Ed., Que Corporation, Aug. 1999.
Hicks et al., "Dynamic software updating", ACM PLDI, pp. 13-23, 2001.
iTouch 27 New Games brochure, JVL Corporation, 2005, 2 pages.
iTouch 8 Plus brochure, JVL Corporation, 2005, 2 pages.
Kozierok, The PC Guide, Site Version 2.2.0, http://www.pcguide.com, Apr. 17, 2001.
Liang et al., "Dynamic class loading in the Java virtual machine", ACM OOPSLA, pp. 36-44, 1998.
Look and iTouch brochure, JVL Corporation, 2004, 2 pages.
Megatouch Champ brochure, Merit Industries, Inc., 2005, 2 pages.
Melnik et al., "A mediation infrastructure for digital library services", ACM DL, pp. 123-132, 2000.
Mod Box Internet brochure, Merit Entertainment, 2006, 2 pages.
Newsome et al., "Proxy compilation of dynamically loaded java classes with MoJo", ACM LCTES, pp. 204-212, 2002.
Patent Abstract of Japan vol. 95, No. 010 & Jp 07 281682 a (Naguo Yuasa), 27 Oct. 1 JP 07 281682, figure 1-6 abrége.
Schneier, "Applied Cryptography", Second Edition, John Wiley & Sons, Inc. New York, 1996.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, (Sep. 22, 1999).
Bonczck, Robert H. et al, "The DSS Development System", 1983 National Computer Conference, Anaheim, California, May 16-19, 1983, pp. 441-455.
IBM Technical Disclosure Bulletin, vol. 30, No. 5, Oct. 1987, "Method for Automated Assembly of Software Versions", pp. 353-355.
"High-speed Opens and Shorts Substrate Tester", IBM Technical Disclosure Bulletin, vol. 33, No. 12, May 1991, pp. 251-259.
"Darts Revolution Again", Replay Magazine, Mar. 1991, pp. 146-148.
Galen A. Grimes, "Chapter 18, Taking Advantage or Web-based Audio."
Petri Koskelainem "Report on Streamworks™".
W. Richard Stevens, "TCP/IP Illustrated: vol. 1, the Protocols".
"Robotic Wafer Handling System for Class 10 Environments" IBM Technical Disclosure Bullentin, vol. 32, No. 9A, Feb. 1990, pp. 141-143.
Nowell Outlaw "Virtual Servers Offer Performance benefits for Networks Imaging".

* cited by examiner

AUDIOVISUAL REPRODUCTION SYSTEM

This is a continuation of U.S. application Ser. No. 11/797,421, filed May 3, 2007 now U.S. Pat. No. 7,757,264, which is a continuation of U.S. application Ser. No. 09/621,674, filed Jul. 24, 2000, now U.S. Pat. No. 7,231,656, which is a divisional of application Ser. No. 09/357,762, filed Jul. 21, 1999, now U.S. Pat. No. 6,336,219, which claims priority to French Application No. 9809352, filed Jul. 22, 1998, the entire contents of each of which are hereby incorporated by reference in this application.

FIELD OF THE INVENTION

This invention relates to a digital audiovisual reproduction system triggered by the payment of fees.

BACKGROUND OF THE INVENTION

International patent application WO 96/12257 deposited by the applicant relates to a system for a digital audiovisual reproduction system which will be described later. This system is also called a juke-box, and is usually placed in a leisure area such as a bar. The bar manager who rents the audiovisual reproduction system from an operator can access functions for setting physical parameters, and also a management mode, through a touch screen and a graphic interface. He can use this screen and this interface to order musical selections through an audiovisual data distribution network and a host server, and these musical selections will be downloaded onto the audiovisual reproduction system by a host server in the downloading center. The operator can also access configuration functions for the reproduction system and can also order downloadable musical selections. Customers select songs using the touch screen associated with the graphic interface. This system is very efficient for the reproduction of sound and images, but it requires a certain amount of skill to set the physical parameters and requires frequent movements by the operator. Furthermore, not all capabilities of the system are used.

OBJECTS AND SUMMARY OF THE INVENTION

Therefore, the purpose of this invention is to overcome the disadvantages of prior art by proposing an audiovisual reproduction system with many functions, particularly to enable increased interaction between the audiovisual reproduction system and the various user types, and to simplify its use.

The first purpose of this invention is to propose a function for controlling the volume of the sound output through the loudspeakers.

This purpose is achieved by the fact that the Audiovisual reproduction system comprising a central unit managing a sound control circuit, and a telecommunications modem connected to a distribution network controlled by a host server, through a multitask operating system created around a library of tools and services, wherein the operating system comprises a function that adjusts the sound control circuit to couple volumes in the various areas in which the loudspeakers in the audiovisual reproduction system are used, this function being accessible through a management mode of the multitask operating system, the coupling maintaining the ratios between the various volumes in each area when the volume in one area is modified.

According to another feature, the volume generated by the loudspeakers is programmable using a tools and services library management mode as a function of the time of the day.

According to another feature, the volume setting parameters can be downloaded through a request sent by the host server to the telecommunications modem in the audiovisual reproduction system.

A second purpose of this invention is to facilitate the work done by operators.

This second purpose is achieved by the fact that the audiovisual reproduction system comprises of a central unit controlling the display means, a touch screen, memory means and a telecommunications modem connected to a distribution network controlled by a host server through a multitask operating system comprising a library of tools and services, wherein the operating system of the reproduction system automatically sends a request to the host server requesting that at least one selected song be downloaded, each song being determined as a function of the answers to a questionnaire, which is stored in a file in the system memory means, to be displayed by display means at the appropriate moment, and to which users reply by actions on the touch screen.

According to another feature, the reproduction system or the operator download a list of songs on the host server through the information distribution network, the host server then downloading the songs in the list prepared by the operator into the memory means of a determined audiovisual reproduction system through the same distribution network.

According to another feature, an order is sent to at least one determined reproduction system through a file downloaded on the reproduction system through the host server, this order being memorized by the reproduction system and used to play one or more particular songs at one or more particular moments.

A third purpose of this invention is to enable interaction between the user and the audiovisual reproduction system.

This third purpose is achieved by the fact that the reproduction system comprises a central unit controlling display means, a touch screen, memory means and a telecommunications modem, through a multitask operating system comprising a library of tools and services, wherein at least one image or animation describing at least one coming artistic event close to the location in which the audiovisual reproduction system is installed, is firstly downloaded into a file in the reproduction system, and the reproduction system operating system reads this file so that the display means of the audiovisual reproduction system can be used to show the image(s) and/or the animation(s) memorized in the file, at specific regular intervals or after a selection of music performed by the artist participating in the artistic event.

According to another feature, the display means show a screen that users of the audiovisual reproduction system can use through the telecommunications means to order entry tickets for the artistic events displayed on the display means, the payment for these entry tickets being made through payment means forming part of the audiovisual reproduction system.

According to another feature, the reproduction system comprises printing means for printing entry tickets or means of recording the entry tickets corresponding to artistic events shown on the display means, on a portable electronic object.

According to another feature, the display means use a file in the operating system of the reproduction system to show a screen on the display means inviting the user to answer a series of questions by touching the touch screen, the answers to the questions then being stored in a file stored in the memory means to be sent later to the downloading center for processing.

According to another feature, the display of the series of questions is initiated after a given song has been selected, or as a function of the number of selections made by the user.

According to another feature, the information related to each image and/or animation is stored in a downloadable file on the memory means of the audiovisual reproduction system through a request sent by the host server.

According to another feature, the display means in the audiovisual reproduction system are used after a determined number of paying musical selections have been made, to display an interactive advertisement recorded in a file in the memory means, and consisting of a game in which the user can either win a musical selection, or answer a questionnaire recorded in the memory means of the system, or obtain free tickets to attend an event.

A fourth purpose of the invention is to increase flexibility of use offered to the operator.

This fourth purpose is achieved by the fact that the audiovisual reproduction system comprises a central unit controlling display means, memory means controlled by an operating system comprises a tools and services library, wherein an operator can access a module in the tools and services library, to offer the manager of the audiovisual reproduction system a given number of credits, one credit corresponding to the fee necessary to select one song, the number of credits being stored in a file on the memory means, this file being updated each time that the manager uses a credit and each time that the operator supplies one or more credits.

According to another feature, credits supplied by the operator can be used within a given time range determined by a program module that displays a special screen for selection of time ranges within which the credits in the reserve may be used.

According to another feature, credit reserve can only be used by the manager, and is controlled by the manager entering a confidential code requested every time before the use of a credit in the reserve is validated.

According to another feature the operation consisting of crediting the credit reserve can only be used by the operator by entering a confidential code requested every time before adding a credit to the reserve is validated.

credits supplied by the operator can be used within a given time range.

According to another feature, the operator can limit the ranges of values within which the manager can modify the physical parameters of the audiovisual reproduction system.

Other features and advantages of this invention will become clearer after reading the following description with reference to the attached drawing.

BRIEF DESCRIPTION OF THE DRAWING

The sole shows an electrical diagram for an audiovisual reproduction system according to prior art compatible with the characteristics of the invention.

DESCRIPTION OF THE PREFERRED EMBODIMENTS

Before beginning the actual description, it is worthwhile defining a number of elements. Firstly, the term "operator" is used in this description to describe a person or a company who installs and maintains the audiovisual reproduction system. The term "manager" is used to describe a person or a company who rents the audiovisual reproduction system, usually from an operator, and who uses the system for profit making purposes. Finally the term "user" is used to describe any person who uses the reproduction system rented by a manager for leisure purposes.

For example, the reproduction system used for application of the characteristics of the invention is as described in international patent application WO 96/12257 deposited by the applicant.

Preferably, but non-restrictively, the audiovisual reproduction system uses the hardware components listed and referenced below.

Figure 1:
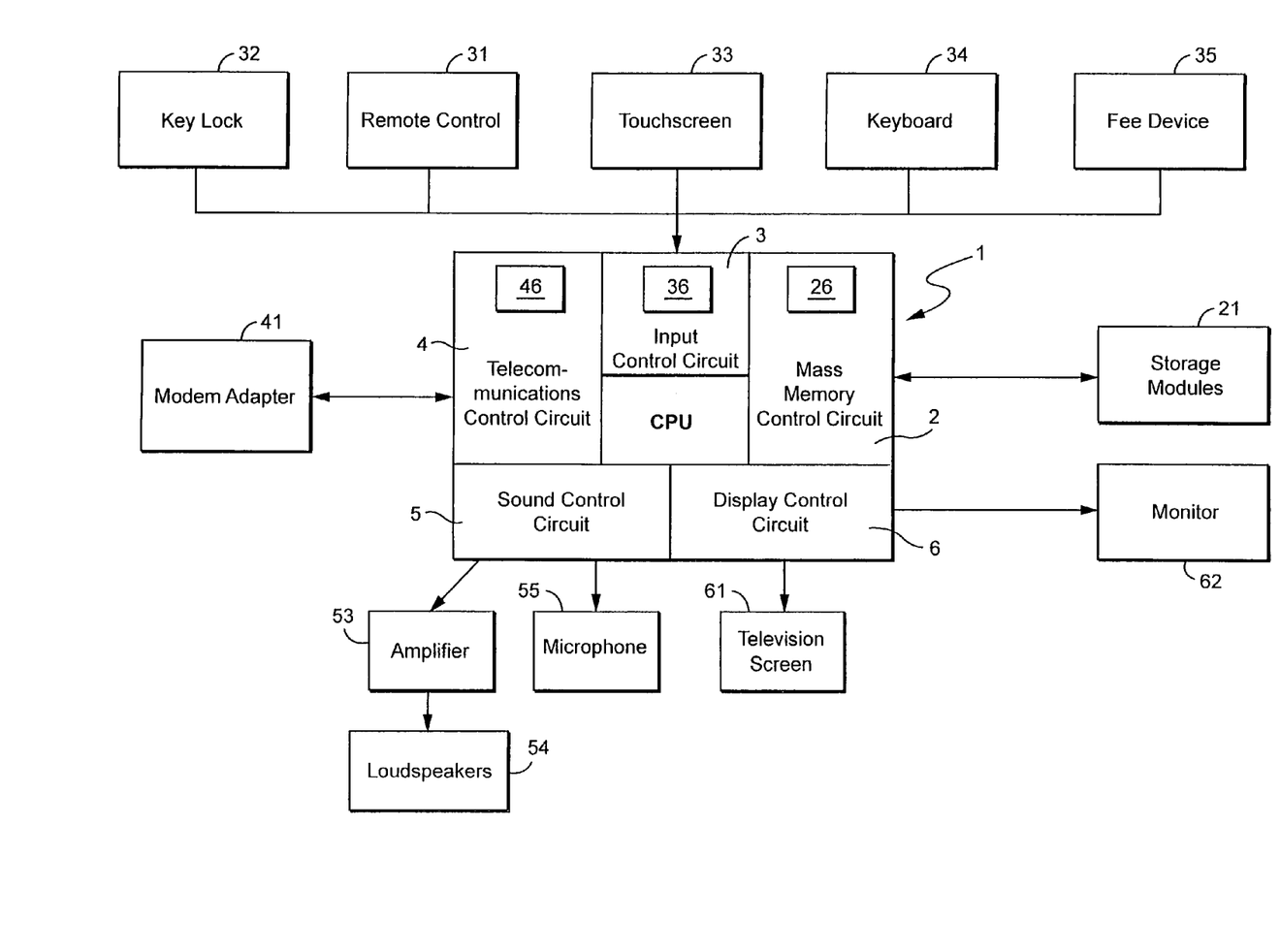

The central microprocessor unit (1) is a high performance PC compatible system, the choice at the time of the installation being made for an Intel type system which has at least the following memory means and characteristics:
 compatibility with the Vesa local bus
 processor cache memory: 256 kbytes
 32 Mbyte of RAM
 high performance serial and parallel ports
 SVGA microprocessor type graphic adapter
 SCSI/2 type bus controller
 self-powered static RAM.

Another central unit with equivalent performances could be used in the invention.

This central unit controls and manages a sound control circuit (5), a telecommunications control circuit (4), an input control circuit (3), a mass memory control circuit (2), and a display means control circuit (6). The display means comprise mainly of an SVGA type high resolution, low radiation, flat screen video monitor (62) without interlacing, this monitor being used for reproduction of images (for example album covers of musical selections), graphics and video clips.

The memory means also include storage modules (21) using high speed, high capacity, SCSI hard disks, and are associated with memory means already installed in the microprocessor device. These modules are used for the storage of audiovisual information.

A 28.8 kbps high speed telecommunications modem adapter (41) is included to enable the link to an audiovisual information distribution network controlled by a host server.

For reproduction of sound information for musical selections, the system comprises loudspeakers (54) receiving the signal from an amplifier-tuner (53) connected to the music synthesizer type of electronic circuit (5) designed to support a large number of input sources while providing an output with a CD (compact disk) type of quality, for example such as a "Sound Blaster" multimedia audio adapter card for use with a microprocessor A 240 watt ventilated power supply with temperature control provides energy to the system. This power supply is protected against overvoltages and over oscillations.

The audiovisual reproduction system manages a touch screen (33) through its input controller circuit (3) which includes a glass coating panel using the "advanced surface wave technology", and an AT type bus controller. This touch screen is used to display various items of selection information used by customers on the video monitor (62) or a television screen (61), or management command and control information used by the manager or the owner of the system. It is also used, for maintenance purposes, in combination with an external keyboard (34) that can be connected to the system which is already fitted with a keyboard connector for this purpose, controlled by a key lock (32) through the interface circuit (3).

The input circuit (3) also interfaces with the system through a remote control assembly (31), for example composed of:
- an infrared remote control, emitter that has 15 control keys for the microprocessor system and 8 control keys for the projection device.
- an infrared receiver with adapter.

A fee payment device (35) is also connected to the input interface circuit (3). It is also possible to use any other device accepting any other method of payment by coins, notes, tokens, smart cards or a combination of these methods of payment.

It is preferable that the system should be housed inside a steel frame that can be personalized with external parts.

Apart from these elements, a cordless microphone (55) is connected to the sound controller (5), which can transform this sound controller into a powerful public address and information system, or possibly a karaoke machine. Similarly, the system can use a cordless loudspeakers system.

The manager can use the remote control assembly (31) to access and control various controls such as the following, for example from behind the bar:
- the microphone on/off control,
- the loudspeakers mute control,
- the sound volume control,
- a control canceling the musical selection currently being played.

The system operating software is built up around a library of tools and services specifically oriented towards audiovisual applications in a multimedia universe. This library advantageously includes a high performance multitask operating system that efficiently enables simultaneous execution of multiple code fragments. This operating system thus enables concurrent execution of operations carried out on the display means, sound reproduction means and the management of telecommunications links through the distribution network, in an orderly manner while avoiding any conflicts. This software is also very flexible.

Digitized and compressed audiovisual data are stored in the memory means (21).

Each selection is available in two digitized formats, with hi-fi quality or CD quality.

It is essential to note that although all modules described later are apparently used sequentially, in fact the tasks specific to these modules are executed simultaneously in an environment using the multitask operating system.

The first module, called the SSM module, is the system start module. This module only supplies a single service, and consequently it is automatically loaded when the system is switched on. If the system is started with a correct registration number, it then directly enters the "in service" mode of the RMM module.

The REG module is the registration mode module which, when activated for the first time or when approval is necessary for a new registration, states its software serial number and asks the user to input information about himself such as the building name, address and telephone number.

The RMM module is the "in service" mode module, and the system enters this operating mode as soon as the registration number has been validated. In this mode, the system is ready to handle any request that may be initiated by various predefined events, such as for example:
- customers who touch the screen: when a customer or a user touches the screen, the system transfers control of the foreground session to the CBSM (customer browse and select mode) module,
- requests to call the telecommunications server network: the system sends an asynchronous background procedure when it detects a loop on the telephone line; the TSM (telecom services mode) module,
- requests about the key switch (32): when the manager turns the key switch, the system hands over control of his foreground session to the SMM (system management mode) module,
- reception of a remote control signal; when a command is received, SMM system management module processes it in a background session, while the foreground session remains available for other actions,
- the appearance of an end of time out showing that the system is inactive: when one of the various time-outs is activated, control is temporarily handed over to the IRM (inactivity routine module) for processing.

The system remains in "in service" mode until one of the events described above occurs.

The IRM module is the inactivity routines module. This module contains routines performing predetermined functions such as displaying the cover of an album, playing parts of musical tracks present in the system, reproduction of complete selections for internal promotional purposes, audio reproductions for external promotional purposes, spoken promotional announcements of new musical selections, fallback to an auxiliary source that may be used when the system is inactive and after a predetermined but adjustable time period has elapsed, corresponding to a time out.

The SMM module is the system management module. This module carries out functions that order the system to accept input requested through a infrared remote control device, these functions being processed immediately without stopping the process that is taking place. A very large number of functions of this type is possible, and some possible functions are listed in the following non-restrictive list:
- adjustment of the sound volume of played selections,
- adjustment of the sound volume of the played auxiliary source,
- switching the microphone on/off,
- adjusting the microphone sound volume,
- balance adjustment, right channel, left channel,
- control of low frequency volumes,
- control of high frequency volumes,
- order to cancel or skip a range in a musical selection,
- order for panoramic effects, zoom in, zoom out,
- trigger reinitialization of the software program.

The MMM module is the management mode module. This module is triggered when the manager turns the key switch. The ordinary screen display is replaced by a display specific to system management. With this new display, the manager is able to control all settings that can be made with the remote control. He can input additional low level commands, for instance to define commands to be enabled or disabled on the remote control. He can also define a maximum number of high and low levels for each system output source, these limits defining the range available on the remote control. The manager can use this screen to access new selection acquisitions mode by touching a button marked on the touch screen. When the manager has finished defining these commands and the system configuration, he simply removes the key and the system automatically returns to "in service" mode.

The NSAM module is the new selection acquisitions mode module.

The CBSM module is the customer browse and select mode module. This module is accessed from "in service" mode when the customer touches the screen. The user can display a menu that he can use for extensive browsing assisted by digitized voice messages to guide him in his choice of musical selections.

The TSM module is the telecommunications services mode module between the host server and the audiovisual reproduction system. This module is used to manage all management services available on the distribution network. All tasks specific to telecommunications are managed as system background tasks. These tasks never use more than a proportion of the processing time remaining after the system has completed all its foreground tasks. Thus when the system is busy with one of its high priority tasks, telecommunications tasks automatically attempt to reduce constraints on the system resources and recover whatever microprocessor processing time remains available.

The SSC module is the system security control module. This module manages system security, each system gets into contact with a local controller system according to a predetermined time scheme for acquisition of the approval signal in the form of the registration number which enables it to operate. Furthermore, the said system automatically stops operating if a fraud is observed or if the system can no longer communicate to the network.

The SPMM module manages selections of music, songs or videos queued by the system to be executed in the order in which they were selected.

Finally, the manager uses the remote control to manage the system through the SMM module.

The multitask operating system is the essential element to enable simultaneous execution of multiple code fragments and to manage priorities between the various tasks that are awakened.

According to the invention, the volume settings in the various areas may be coupled if management mode is activated. This particular procedure is included in the MMM management module and is materialized on the touch screen (33) by a specific display comprising a button. The coupling procedure is activated when the manager or the operator touches this button. The first operation carried out by this function is to read values of the sound volumes, in the different areas from a file stored on the reproduction system memory means, and the ratios between these various values will be calculated. These ratios are stored in a file stored on the reproduction system memory means (21). When the volume of a determined area is subsequently modified, the procedure automatically reads the new value of the volume in the determined area and calculates the values of the volumes for the other areas such that the ratios between the values for the various areas are identical to the previously calculated and stored ratios. When the coupling procedure is activated, and when the maximum value of the sound volume in one of the areas is reached, increasing the volume in any other area will have no effect. The coupling function is deactivated either by touching the activation button again, or by touching another button, identified as deactivation button on the touch screen.

Advantageously, in order to avoid repeated manipulations to modify the volume, volume modifications are stored in a file so that the volume in different areas can be reduced or increased at determined times. For example (1), this function performed by a routine in the reproduction system operating system, is very useful when the reproduction system is located (1) in a bar. The background noise due to the presence of customers varies at different times of the day. This background noise is higher in busy periods, in other words usually during the evening, and is low when there are fewer people. This situation requires that the sound volume of the reproduction system should be adapted as a function of the background noise. Thus according to the invention, the volume level can be programmed in advance as a function of the time of the day. The routine in the operating system of the audiovisual reproduction system reads this file later, thus automatically making the preprogrammed changes to the volume level.

Advantageously, the file containing the volume settings as a function of the time of the day can be downloaded onto the memory means of the audiovisual reproduction system through the data distribution network and the reproduction system modem (41), in other words there is no need to be able to access reproduction system in order to create this file. The file may be generated on a different computer system and then downloaded onto the reproduction system through the distribution network and the telecommunications modem (41).

Audiovisual reproduction systems according to prior art enable downloading of new selections through a distribution network and a host server. However, commands for new selections must be made through the touch screen (33) and a module in the operating system of each reproduction system, and in some cases requires operator intervention. In order to avoid repeated movements of the operator to order new selections, the operating system has a procedure integrated into a module of the reproduction system by which the user can choose at least one new selection in a list. This procedure consists of starting to read the file stored on the memory means which displays a special screen on the display means (62). This screen contains a window in which a list of songs is displayed in the form of a popup menu. This list corresponds to selections that are not yet available on the audiovisual reproduction system, but which could be downloaded on the reproduction system. Thus, a message is displayed on the screen inviting users to select the new song(s) that they would like to have on the audiovisual reproduction system simply by touching the touch screen (33) on the title of the required song. Users' choices are memorized in a file stored on the memory means, which is updated whenever a user chooses a new selection in the list. The number of times that a selection is chosen is counted. This number is then compared with a predetermined threshold. When the number of times that a selection is chosen exceeds a predetermined threshold, the reproduction system sends a request to the host server to request that the selection is downloaded. Thus, new selections are ordered and downloaded without action by the manager or the operator, which considerably simplifies the operation of ordering new selections.

Advantageously, in order to avoid the operator needing to move to order new selections, the operator is also able to download new selections onto an audiovisual reproduction system without using the touch screen in the reproduction system. In order to use this feature, the operator must have a computer connected to the reproduction systems host server through a data distribution network. The operator prepares a list of new selections to be downloaded and then sends a request to the host server through the distribution network. This request includes the list of new selections to be downloaded and the identification of the reproduction system on which the new selections are to be downloaded. When the host server receives this request, the new songs on the list will be downloaded onto the memory means of the reproduction system corresponding to the identification. After these new selections have been received, the reproduction system updates the list of available musical selections. Thus, the new selection control operation is carried out without any need for the operator to move.

Another feature of the reproduction system according to the invention is to enable a particular song to be played at a defined time simultaneously on at least one determined reproduction system. For example, this feature may be used to promote a new album or a concert given by a singer. For example, this feature could be used to play the title song of a singer's new album on all reproduction systems, on the day that it is distributed in the shops. This feature can also be used to distribute a song by this singer on reproduction systems located close to the location at which a concert given by the singer will shortly be held. Playing a particular song at a particular moment on at least one particular reproduction system is initiated by a series of orders contained in a file located on each audiovisual reproduction system. The orders contained in the file determine which song should be played and the moment(s) at which it should be played. Advantageously, the file containing orders for execution of the particular song at a particular moment is downloaded on each reproduction system concerned through the host server and the distribution network. The orders contained in the file will be executed when the audiovisual reproduction system reads this file.

The reproduction system according to the invention can also be used to create an interaction with the user. This interaction is materialized by a series of functions. The first function consists of using display means (62) to show at least one image and/or animation related to a coming artistic event close to the reproduction system. This display informs the users about this event. These sequences of images and/or animations are memorized in a file stored on the memory means of the reproduction system. The images and/or animations will be displayed when this file is read, for example through the IRM module (inactivity routines management module). Advantageously, a user can use the reproduction system according to the invention to order entry tickets for the artistic event described by the images and/or animations displayed on the display means of the reproduction system. A special button is displayed on the screen displaying the images and/or animations of the artistic event, for this purpose. If a user touches this button, a subroutine starts which will display a new screen. The user can use this new screen to order tickets for the artistic event. For example, the screen may have different possible booking dates, the type of seats available, the means of payment preferred by the user and any other information necessary to prepare the entry ticket. Advantageously, the payment means (35) in the audiovisual reproduction system are used for payment of the entry tickets. Advantageously the audiovisual reproduction system comprises means that firstly enable communication with the host server or the rental server and secondly, after receiving agreement, are capable of printing entry tickets. The means of issuing entry tickets also or alternatively comprise means of recording the entry ticket on a portable electronic object, such as a smart card. For example, these means may include means of reading from and writing to the electronic circuit of a smart card. When a user would like to book an entry ticket, a screen invites him to insert his card in the reading and writing means. This action triggers a procedure in the operating system of the reproduction system which firstly triggers a new card user identification procedure and secondly (after the entry tickets rental server has approved) triggers steps to record the entry ticket on the card electronic circuit. The file memorizing images and/or animations describing the artistic event may advantageously be downloaded on at least one audiovisual reproduction system through the host server and the distribution network.

Another feature of the reproduction system according to the invention is to make a request to users by means of at least one image stored in a file and displayed by display means (62) of the audiovisual reproduction system by executing a procedure in the operating system of the audiovisual reproduction system. The procedure is triggered whenever a particular event occurs. The image comprises a series of windows. For example, a first window may include a series of questions about the user, for example his or her age, sex, profession and/or any other information. A second window may for example include a series of questions about the required inquiry. For example this inquiry may be a satisfaction inquiry about a particular artist, or any other inquiry. Each question is associated with a particular answer area on the touch screen (33). The answers to the various questions are made simply by touching this area. Answers to the various questions in the inquiry are memorized in a file stored on the memory means of the audiovisual reproduction system. This file is then downloaded onto the host server. Advantageously, a subroutine in the operating system verifies if the questionnaire corresponding to the inquiry was fully filled in by the user. If so, the operating system triggers a subroutine that will credit means (35) of payment of an amount corresponding to one song selection and informs the user that he has the right to select an additional song, by displaying a special screen. Advantageously, the procedure to display the screen containing the series of questions is triggered by a predetermined event. For example, this event may be the selection of a particular song or the n(th) selection of the same or a different song by the same user, which corresponds to a determined payment amount.

Advantageously, the display means (62) of the reproduction system are used to display advertisements. Advertising displays are triggered by a subroutine in the operating system, for example after the user has made a given number of paying musical selections. This advertisement, memorized in a file stored on the memory means, appears in the form of a game designed around the company being advertised. Interaction between the user and the game forming the interactive advertising consists of the user pressing on the touch screen (33) of the reproduction system. If the user wins the game, a subroutine in the operating system of the reproduction system is triggered to either credit payment means (35) by an amount corresponding to the selection of a song and inform the user on a specific screen that he has the right to make a musical selection of his choice free of charge, or to display a special screen inviting the user to answer a questionnaire. For example, the questionnaire may be an inquiry about satisfaction with the audiovisual reproduction system or any other inquiry of the type described above.

The reproduction system according to the invention also provides the operator with a certain degree of flexibility. With the audiovisual reproduction system according to the invention, the operator can pay the manager of the reproduction system for a particular number of credits. A credit is equal to the fee necessary to select one song. This credit reserve is stored in a file stored on the memory means (21) of the reproduction system. To add one credit to the reserve, the operator accesses a first specific button, using a specific screen. Touching the touch screen (33) at the position of this button triggers a subroutine in the reproduction system which updates the file corresponding to the credit reserve and adds one credit to this reserve. When the manager wants to use a credit in the reserve, he uses a second special screen to access a second special button. Touching the touch screen (33) at the location of this second button triggers a subroutine in the operating system which firstly credits the payment means (35) of the reproduction system by an amount corresponding to payment of the price to select one song, if the credit reserve is not empty, and secondly updates the file corresponding to the credit reserve by removing one credit from the reserve. The use of credits is reserved exclusively for the manager, who uses them by inputting a code required when the second special button is used or by means of a special function on the remote control means (31). Access to the credit reserve file is reserved exclusively to the operator (for example by means of a code requested when the first special button is used). Thus, the operator alone can increase the credit reserve, and the manager alone can use this reserve. Advantageously, there is a program module for displaying a special screen to define time periods during which credits offered by the operator can be used. A subroutine prevents access to the second special button outside these determined time ranges, so that the manager cannot use credits in the reserve.

In order to prevent the manager from incorrectly using management mode functions of the audiovisual reproduction system, the operator may fix ranges of values between which the manager can modify the physical settings of the audiovisual reproduction system. These limitations are made by means of low level functions exclusively accessible in MMM mode (Module management mode) by a special screen that is locked, for example, by means of a code known only to the operator. Due to these limitations, there is no risk that the manager will make the reproduction system completely inoperative, and the operator will need to make fewer interventions.

It is obvious that other modifications that can be made by an expert in the subject fall within the scope of the invention.

The invention claimed is:

1. A jukebox system comprising a plurality of jukebox devices provided at different respective venues and connected to a distribution network controlled by a host server, at least some of said jukebox devices comprising:
 a display, comprising a touch screen portion, operable to display at least a customer interface, wherein the customer interface comprises at least one displayed touch selectable option corresponding to at least one song for selecting the corresponding song to be played;
 a memory operable to store at least songs that may be played on the jukebox device in response to selections from a customer;
 an audio reproduction system operable to provide audio;
 a communication system for enabling the respective jukebox device to communicate with the distribution network;
 a fee payment device for accepting payment of a fee; and
 a multi-tasking operating system,
 wherein each of these jukebox devices is configured to download from the distribution network instructions ordering each of these jukebox devices to (a) interrupt an ordinary pay-for-play mode thereof and (b) instead play one or more songs from the memory of the respective jukebox devices at one or more specified times,
 wherein the multi-tasking operating system of each of these jukebox devices is configured to cause the playback of the one or more songs residing on the memory of the respective jukebox at the one or more specified times based on the downloaded instructions, in response to the downloaded instructions being stored to and read from the memory of the respective jukebox device, and
 wherein the instructions (a) are downloaded to a partial subset of the jukebox devices connected to the distribution network, the partial subset depending on first predefined criteria, the first predefined criteria being geographic proximity to a concert to be given by an artist who performs the one or more songs; (b) specify the one or more songs to be played based on second predefined criteria, the second predefined criteria being an indication that a song is performed by an artist for whom a promotion is to be run; and/or (c) indicate the one or more specified times, the one or more specified times corresponding to one or more times on one or more dates of a musical release by an artist who performs the one or more songs and/or one or more times on one or more dates close to a date on which a concert given by an artist who performs the one or more songs is to be held.

2. A method of operating a jukebox system comprising a plurality of jukebox devices provided at different respective venues and connected to a distribution network controlled by a host server and each including a display comprising a touch screen portion operable to display at least a customer interface, wherein the customer interface comprises at least one displayed touch selectable option, corresponding to at least one song, for selecting the corresponding song to be played; a memory operable to store at least songs that may be played on the jukebox device in response to selections from a customer; an audio reproduction system operable to provide audio; a communication system for enabling the jukebox device to communicate with the distribution network; a fee payment device for accepting payment of a fee; and a multi-tasking operating system, the method comprising:
 sending, to a partial subset of the jukebox devices, instructions ordering each said jukebox device in the partial subset to temporarily cease pay-for-play operations thereon and to play one or more songs at one or more specified times;
 specifying (a) the jukebox devices to which the instructions to be sent based on geographic proximity to a concert to be given by an artist who performs the one or more songs, (b) the one or more songs based on an indication that a song is performed by an artist for whom a promotion is to be run, and/or (c) the one or more specified times corresponding to one or more times on one or more dates of a musical release by an artist who performs the one or more songs and/or one or more times on one or more dates close to a date on which a concert given by an artist who performs the one or more songs is to be held; and
 causing the partial subset of the jukebox devices to play the one or more songs at the one or more specified times from the memory of the respective jukebox device in dependence on the instructions and in response to the instructions being sent and stored to, and subsequently read while residing on a storage medium of, the respective jukeboxes.

3. The method of claim 2, further comprising causing the simultaneous playback of the one or more songs on the one or more dates based on the instructions.

* * * * *